United States Patent [19]

Galli et al.

[11] Patent Number: 4,594,277

[45] Date of Patent: Jun. 10, 1986

[54] ADHESIVE TAPES HAVING A FILM BACKING OF POLYPROPYLENE OR OTHER OLEFINIC POLYMER OR COPOLYMER AND RELATED MANUFACTURING PROCESS

[75] Inventors: Graziano Galli, Formia; Felice Pina, Milan, both of Italy

[73] Assignee: Manuli Autoadesivi S.p.A., Milan, Italy

[21] Appl. No.: 692,874

[22] Filed: Jan. 18, 1985

Related U.S. Application Data

[63] Continuation of Ser. No. 498,518, May 26, 1983, abandoned.

[30] Foreign Application Priority Data

Jun. 11, 1982 [IT] Italy ............................. 21842 A/82

[51] Int. Cl.⁴ ............................................. A61F 13/20
[52] U.S. Cl. .................................... 428/40; 428/354; 428/355; 428/906
[58] Field of Search ................ 428/40, 354, 355, 36, 428/39, 506

[56] References Cited

U.S. PATENT DOCUMENTS

| | | | |
|---|---|---|---|
| 4,029,843 | 6/1977 | Shah et al. | 428/40 |
| 4,287,255 | 9/1981 | Wong et al. | 428/40 |
| 4,313,988 | 2/1982 | Koshar et al. | 428/40 |
| 4,339,485 | 7/1982 | Shibano et al. | 428/40 |
| 4,358,494 | 11/1982 | Akimoto et al. | 428/40 |

*Primary Examiner*—Edith Buffalow
*Attorney, Agent, or Firm*—Murray and Whisenhunt

[57] ABSTRACT

For pressure sensitive adhesive tapes having a film backing of polypropylene or other olefinic polymer or copolymer, the treatment of the non adhesive side before the release coat is applied causes the unwinding noise of the tape to be essentially reduced.

3 Claims, No Drawings

ADHESIVE TAPES HAVING A FILM BACKING OF POLYPROPYLENE OR OTHER OLEFINIC POLYMER OR COPOLYMER AND RELATED MANUFACTURING PROCESS

This application is a continuation of Ser. No. 498,518, filed May 26, 1983, now abandoned.

The present invention relates to pressure sensitive adhesvie tapes with a film support of olefinic polymer or copolymer capable of being unwound with low noise.

The pressure sensitive adhesive tapes having a film backing of polypropylene or other olefinic polymers or copolymers (either mono- or bi-oriented, or with balanced stretching, or coextruded, etc.) as manufactured with:

adhesive compositions having elastomeric or plastomeric basis and applied by
(a) standard processes from solutions in organic solvents;
(b) melt processes, better known as hot melt processes;
(c) reacting processes;
possible priming compositions, if deemed necessary;
anti-adhesive layers (as applied to the opposite side with respect to that having the adhesive layer coated thereto), generally based on polyvinylcarbamate, polyvinylbehenate, etc. are unwound, especially if the unwinding operation is carried out at high speed, as it occurs in the cutting of bobbins for the manufacturing of rolls or in the application of the tape with automatic or semi-automatic or even manually operated equipments, with high noise levels, such as to give place to queries from the personnel attending to the tape cutting and applying operations, as well as of people casually present in the shop.

The reasons for which the noise level of tapes having film backings of polypropylene or other olefinic polymers is higher, the operating conditions being the same than that of tapes having a different type of support, such as for instance tapes having a film backing of polyvinyl chloride, have not yet been clarified.

It is through that these reasons can be attributed to:
(a) the physical properties of the backing such as:
thickness
stiffness
surface state (smooth, glazed, rough, etc.)
(b) the properties depending on the surface energies of the backing such as:
surface free energy
critical surface tension
friction static coefficients
(c) the properties depending on the adhesive forming system, such as:
tape adhesive value
adhesive value to the backing
unwinding force
nature and composition of the adhesive
nature and composition of the anti-adhesive layer.

Owing to economical reasons, film backings of increasingly reduced thickness are used, but there is possible to modify their stiffness by using block or random $C_2C_3$ copolymers as well as to modify the surface state of the backing by having recourse to coextruded films, the outer layer of which is modified by means of additives of suitable nature and physical state.

The structure and the chemical nature of the polymer forming the film backing are of undoubtable importance as regards the static coefficient of friction and the critical surface tension.

Illustrative examples are reported hereinafter:

| Polymer | Static coefficient of friction | Critical surface tension (dynes/cm) |
| --- | --- | --- |
| polyvinylidene chloride | 0.90 | 40 |
| polyvinylchloride | 0.50 | 39 |
| polypropylene | 0.34 | 32 |
| polyethylene | 0.33 | 31 |
| polyvinylfluoride | 0.30 | 25 |
| polytrifluoroethylene | 0.30 | 22 |
| polytetrafluoroethylene | 0.04 | 18 |

The surface modification as induced by corona, flame, irradiating treatments, by changing the surface chemical structure of the film support, owing to the forming of polar compounds, to the strengthening of the surface layer resulting from the cross-linking and the anchoring of low molecuar weight polymeric fractions, to the increasing of the critical surface tension, may contribute to the occurrence of conditions suitable for increasing or reducing the noise level of the tape.

The properties strictly depending on the film adhesiving and releasing compositions, on the adhesive nature and application system, on the rehological rehaviour of the adhesive, on the adhesion specific values of the adhesive and on the unwinding force as regards the back side, relevantly influence the noise level of the tape.

Owing to the high noise level of adhesive tapes having a polypropylene film backing, their use is avoided in a number of application, although these films are notoriously more economical than PVC films and other used in the manufacturing of pressure sensitive adhesive tapes.

The main purpose of the present invention is that of providing a pressure sensitive adheisve tape having a film backing of polypropylene or other olefinic polymer or copolymer which shows low unwinding noise.

It has been found and is the subject of the present invention that the above purpose is achieved by means of a pressure sensitive adhesive tape of the type comprising a film backing or support of polypropylene or other olefinic polymer or copolymer, said backing being coated on the adhesive side, after a suitable treatment to bring the critical tension to a value of the order of 40 dynes/cm, with a primer layer and with an adhesive layer, and furthermore having the non adhesive side coated with a releasing layer, characterized in that said non adhesive side, before said releasing layer is applied, is treated so as to bring the critical surface tension to a value of at least 33 dynes/cm.

As a matter of fact, it has been found that it is thus possible, in a fully surprising manner, to reduce the noise to values exceedingly lower than those tolerable or admitted by law.

As regards the treatment to be carried out on the non adhesive or back side of the adhesive tape in order to bring the critical surface tension to values equal or higher than the afore said threshold, it may be every one of the processes known and used for such a purpose, like the treatment by electric discharge with corona effect, the flame treatment, the irradiation etc.

The treatment according to the invention has been carried out with respect to pressure sensitive adhesive tapes having a support of polypropylene film of 30 micron thickness, in which the side to be made adhesive had been treated so as to bring the critical surface tension to a value of 40 dynes/cm and coated with an anchoring layer of elastomeric primer (1 to 4 g/sq.m.) and with an elastomeric adhesive (24 g/sq.m.).

The side opposite to the adhesive one was treated so as to bring the critical surface tension to 35 dynes/sq.cm., whereafter a release layer was applied.

Adhesive tapes manufactured according to the standard technology, known in the related art, on the basis of the aforesaid characteristics, the specific properties were evaluated, and it was found that the adhesion force with respect to steel varied between 220 and 240 g/cm. that related to the back side varied between 120 and 190 g/cm, the low speed unwinding force was of between 130 and 170 g/cm and lastly that the noise index decreased to values of between 30 and 50, referred to an identical adhesive tape except that the non adhesive side had not been subjected to the afore said treatment.

Like results were obtained when the critical surface tension of the back side was brought to values of about 38 dynes/cm before applying the release layer.

In the preceeding specification reference was made to adhesive tapes having a polypropylene film backing, but it is to be understood that the invention does hold true as well for film backings formed by other olefinic polymers and copolymers.

We claim:

1. An adhesive tape with reduced unwinding noise, said tape comprising:
    a film backing of polypropylene or other olefinic polymer or copolymer, having an adhesive side and a non-adhesive side;
    a primer and an adhesive layer on said adhesive side;
    a release layer on said non-adhesive side; said non-adhesive side of said film backing having been treated so that it has a surface tension not lower than 33 dynes/cm.

2. An adhesive tape according to claim 1, wherein said surface tension is about 35 dynes/cm.

3. An adhesive tape according to claim 1, wherein said surface tension is about 38 dynes/cm.

* * * * *